United States Patent
Thwaites (10) Patent No.: US 8,825,715 B1
(45) Date of Patent: Sep. 2, 2014

(54) DISTRIBUTED STATE/MASK SETS

(75) Inventor: Jacoby Thwaites, London (GB)

(73) Assignee: Google Inc., Mountain View, CA (US)

( * ) Notice: Subject to any disclaimer, the term of this patent is extended or adjusted under 35 U.S.C. 154(b) by 185 days.

(21) Appl. No.: 13/284,675

(22) Filed: Oct. 28, 2011

Related U.S. Application Data (60) Provisional application No. 61/408,364, filed on Oct. 29, 2010.

(51) Int. Cl.
*G06F 17/30* (2006.01)

(52) U.S. Cl.
USPC .......................... 707/804; 715/225; 715/780

(58) Field of Classification Search
None
See application file for complete search history.

(56) References Cited

U.S. PATENT DOCUMENTS

| | | | |
|---|---|---|---|
| 5,652,806 A * | 7/1997 | Friend ........................... | 382/175 |
| 6,049,832 A * | 4/2000 | Brim et al. .................... | 709/237 |
| 6,216,131 B1 * | 4/2001 | Liu et al. ............................... | 1/1 |
| 6,282,632 B1 * | 8/2001 | Higaki et al. ................... | 712/42 |
| 6,538,660 B1 * | 3/2003 | Celi et al. ....................... | 345/592 |
| 6,732,088 B1 * | 5/2004 | Glance ................................ | 1/1 |
| 7,133,913 B2 | 11/2006 | Thwaites et al. | |
| 2002/0073138 A1 * | 6/2002 | Gilbert et al. ................. | 709/201 |
| 2002/0194035 A1 * | 12/2002 | DiRienzo ........................... | 705/4 |
| 2004/0122869 A1 * | 6/2004 | Muehl et al. ................... | 707/201 |
| 2005/0086199 A1 * | 4/2005 | Champagne et al. ............. | 707/1 |
| 2005/0086381 A1 * | 4/2005 | Sjoberg et al. ................. | 709/246 |
| 2005/0193142 A1 | 9/2005 | Thwaites et al. | |
| 2005/0222981 A1 * | 10/2005 | Lawrence et al. ................. | 707/3 |
| 2005/0246390 A1 * | 11/2005 | House et al. ................... | 707/200 |
| 2005/0278492 A1 * | 12/2005 | Stakutis et al. ............... | 711/161 |
| 2005/0289100 A1 * | 12/2005 | Dettinger et al. .................. | 707/1 |
| 2006/0056626 A1 * | 3/2006 | Keohane et al. ............... | 380/206 |
| 2006/0074897 A1 * | 4/2006 | Fergusson ........................... | 707/4 |
| 2006/0085399 A1 * | 4/2006 | Carmel et al. ...................... | 707/3 |
| 2007/0016824 A1 * | 1/2007 | Bivens et al. ....................... | 714/6 |
| 2007/0027855 A1 * | 2/2007 | Kagawa ............................ | 707/3 |
| 2007/0043693 A1 * | 2/2007 | Krieg ................................ | 707/1 |
| 2007/0110224 A1 * | 5/2007 | Gumpel et al. ................. | 380/28 |
| 2008/0033934 A1 * | 2/2008 | Richards et al. .................. | 707/5 |
| 2008/0065665 A1 * | 3/2008 | Pomroy et al. ................ | 707/101 |
| 2008/0222141 A1 * | 9/2008 | Morales ............................ | 707/5 |
| 2008/0319942 A1 * | 12/2008 | Courdy et al. .................... | 707/3 |
| 2009/0013279 A1 * | 1/2009 | Klems et al. ................... | 715/780 |
| 2009/0281974 A1 * | 11/2009 | Saxena et al. ................... | 706/14 |
| 2009/0287678 A1 * | 11/2009 | Brown et al. ...................... | 707/5 |
| 2010/0088590 A1 * | 4/2010 | Bajohr et al. ................. | 715/235 |
| 2010/0135535 A1 * | 6/2010 | Gutierrez ....................... | 382/108 |
| 2010/0146070 A1 * | 6/2010 | McDowall ..................... | 709/216 |
| 2011/0055231 A1 * | 3/2011 | Huck et al. .................... | 707/751 |

FOREIGN PATENT DOCUMENTS

| | | | |
|---|---|---|---|
| WO | WO 9843181 | * | 10/1998 |

* cited by examiner

*Primary Examiner* — Augustine K Obisesan
(74) *Attorney, Agent, or Firm* — Fish & Richardson P.C.

(57) ABSTRACT

Methods, systems, and apparatus, including computer programs encoded on a computer storage medium, for executing a first operation using a first system, the first operation generating first output data, generating a first fieldset, the first fieldset including one or more fields corresponding to the first output data, populating the one or more fields of the first fieldset with values of the first output data, transmitting the first output data to a second system, executing a second operation using the second system, the second operation generating second output data, the second output data overlapping the first output data, generating a second fieldset, the second fieldset including one or more fields corresponding to the first output data and the second output data, and populating the one or more fields of the second fieldset with values of the second output data.

20 Claims, 8 Drawing Sheets

| OP | DC | Events across L | Fieldsets in DC2 | Fieldsets in DC3 |
|---|---|---|---|---|
| Start | | | FS1: n=29 | |
| FirstDivisor | | 2 | FS1: n=29, d=3 | |
| Test | | 2 | FS1: n=29, d=3, MAYBE | |
| Iterate | | 1 | | FS2: n=29, d=5 |
| Test | | | | FS2: n=29, d=5, MAYBE |
| Iterate | | | | FS3: n=29, d=7 |
| Test | | | | FS3: n=29, d=7, YES |
| ShowPrime | | 1 | | |

DISTRIBUTED STATE/MASK SETS

CROSS-REFERENCE TO RELATED APPLICATIONS

This application claims the benefit of U.S. Prov. Pat. App. No. 61/408,364, filed Oct. 29, 2010, the disclosure of which are expressly incorporated herein by reference in their entireties.

BACKGROUND

This disclosure relates to distributed states of a computing process and mask sets for routing data.

SUMMARY

According to one innovative aspect of the subject matter described in this disclosure, a state of a distributed process is distributed across a plurality of systems that executed the process. In some implementations, a process is composed of two or more operations, where the two or more operations can be distributed across a plurality of systems such that each system executes one or more operations of the process. Execution of the process includes the generation of a plurality of fieldsets, each fieldset including data corresponding to an output of an operation and providing the data as input to a subsequent operation. The state of the process, or process state, is defined by the set of fieldsets that are in existence at any given instant throughout the execution of the process. Each fieldset has a fieldset state at any given instant throughout the execution of the process, and the fieldsets are independent of one another.

In general, another innovative aspect of the subject matter described in this disclosure may be embodied in methods that include the actions of executing a first operation using a first system, the first operation generating first output data, generating a first fieldset, the first fieldset being resident at the first system and including one or more fields corresponding to the first output data, populating the one or more fields of the first fieldset with values of the first output data, transmitting the first output data to a second system, executing a second operation using the second system, the second operation generating second output data, the second output data overlapping the first output data, generating a second fieldset, the second fieldset being resident at the second system and including one or more fields corresponding to the first output data and the second output data, and populating the one or more fields of the second fieldset with values of the second output data.

These and other implementations may each optionally include one or more of the following features. For instance, overlapping indicates that data of the first output data corresponds to a field and data of the second output data corresponds to the field; the first operation is executed using one or more computing devices of the first system; the second operation is executed using one or more computing devices of the second system; the actions further include executing a third operation, the third operation generating third output data, and appending one or more fields to one of the first fieldset and the second fieldset to provide one or more appended fields, the one or more appended fields being populated with values of the third output data; the first system executing the third operation; the second system executing the third operation; the one or more fields of the first fieldset also being populated with values of the first output data; the actions further including receiving a user input, executing the first operation occurring in response to the user input; the actions further including providing an output to be displayed on a display, the output being included in the second output data; transmitting includes routing the first output data using an information routing layer of a network; the information routing layer including a state machine; the information routing layer being executed by a computing device; the information routing layer being executed by a plurality of computing devices; the plurality of devices being distributed across a plurality of systems; the plurality of systems including at least one of the first system and the second system; each of the first and second fieldsets further including one or more attributes; each of the first and second fieldsets including a unique identifier; the first system including a client-side, frontend computing device; and/or the second system including a server-side, backend computing device.

Other implementations of this aspect include corresponding systems, apparatus, and computer programs, configured to perform the actions of the methods, encoded on computer storage devices.

According to another innovative aspect of the subject matter described in this disclosure, system the receives data as input can provide one or more mask sets to block one or more datasets from being routed to the system. In some implementations, each of the one or more mask sets include one or more fields that define fields and/or data that must be absent from a dataset supplying input to an operation executed by the system. The system can register each of the one or more mask sets with an information routing layer (IRL), which references the registered one or more mask sets to determine whether a particular dataset should be routed to the system.

In general, another innovative aspect of the subject matter described in this disclosure may be embodied in methods that include the actions of registering a mask set, the mask set including one or more fields, each of the one or more fields indicating a field that must be absent from datasets that are to be provided as input to a first system of a plurality of systems, receiving a dataset, the dataset including a field that is present in the mask set, transmitting the dataset to one or more systems of the plurality of systems, and inhibiting transmission of the dataset to the first system.

These and other implementations may each optionally include one or more of the following features. For instance, generating the mask set using the first system; the first system providing the mask set to an IRL, the IRL performing the registering, receiving and transmitting; generating the dataset using the first system; a field of the mask set indicating the first system as a dataset source; generating the dataset using a second system; the information routing layer including a state machine; the information routing layer being executed by a computing device; the information routing layer being executed by a plurality of computing devices; the plurality of devices being distributed across a plurality of systems; and/or the plurality of systems including the first system and the second system.

Other implementations of this aspect include corresponding systems, apparatus, and computer programs, configured to perform the actions of the methods, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
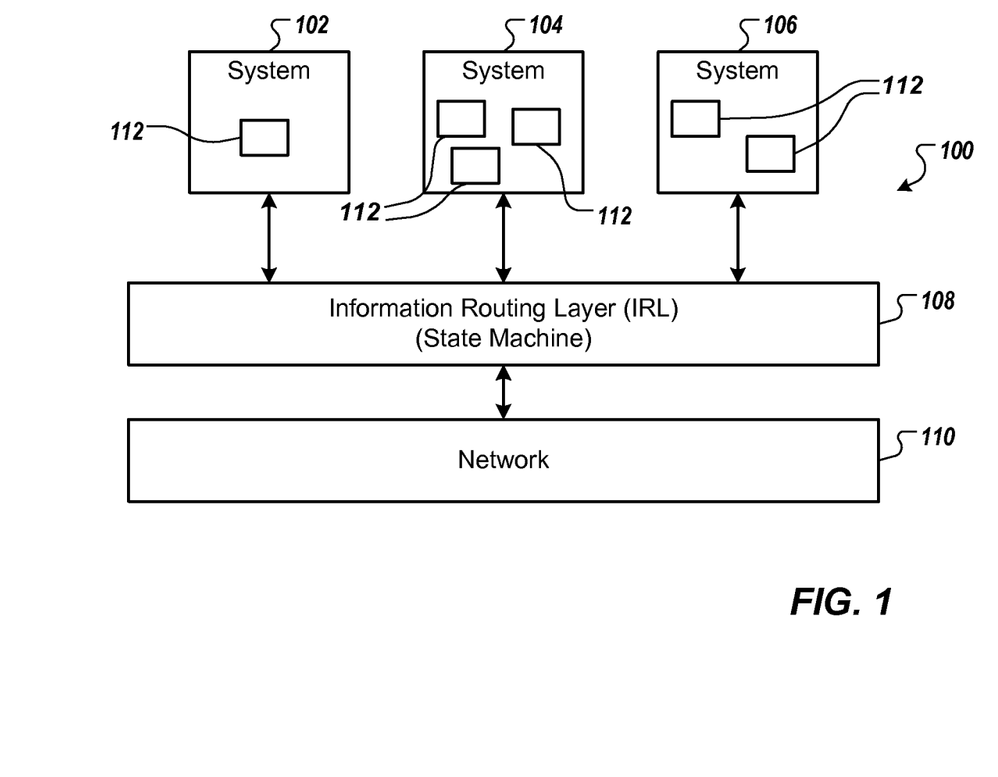
FIG. 1 is a diagram of an example network architecture.

FIG. 1 is a diagram of an example network architecture 100. The network architecture 100 includes one or more systems 102, 104, 106, one or more information routing layers 108, and a network 110. The one or more systems 102, 104, 106 each include one or more computing devices 112. The one or more systems 102, 104, 106 communicate with each other through the information routing layer (IRL) 108 and the network 110. For example, each of the computing devices 112 of one system 102, 104, 106 can communicate with a computing device 112 of another system 102, 104, 106 through the IRL 108 and the network 110. The IRL 108 can generally be implemented as a state machine provided in an application layer above basic underlying data network-layers for routing and transferring data using one or more network protocols (e.g., TCP-IP). In some implementations, the IRL 108 can be distributed across a plurality of systems and is operable to route information between one or more systems (e.g., systems 102, 104, 106). The network 110 can include a large computer network, such as a local area network (LAN), wide area network (WAN), the Internet, a cellular network, or a combination thereof connecting any number of mobile computing devices, fixed computing devices, and server systems.

Each of the computing devices 112 can include any type of computing device such as a desktop computer, a laptop computer, a handheld computer, a personal digital assistant (PDA), a cellular telephone, a network appliance, a camera, a smart phone, an enhanced general packet radio service (EG-PRS) mobile phone, a media player, a navigation device, an email device, a game console, or a combination of any two or more of these data processing devices or other data processing devices. Within a system 102, 104, 106, each of the computing devices 112 can communicate with one another. In some implementations, each of the computing devices 112 communicate with one another using a LAN, WAN, the Internet, a cellular network, or a combination thereof.

Implementations of the present disclosure enable a process to be executed across a network architecture, such as the network architecture 100 of FIG. 1. The process includes a plurality of operations that are distributed across the network architecture. In some implementation, one or more operations of the process are executed by a first system (e.g., the system 102 of FIG. 1) and one or more operations of the process are executed by a second system (e.g., the system 104 of FIG. 1). As discussed in further detail below, fieldsets of information are formed to enable sharing or exchange of information contributed by one or more operations, data users or systems.

Each system generates one or more fieldsets, discussed in further detail below, each fieldset corresponding to an output of an operation of the process. The process includes every operation that occurs as a result of an initial, triggering operation. A state of the process, or process state, is defined by the set of fieldsets that are in existence at any given instant throughout the life of the process. Each fieldset has a fieldset state at any given instant throughout the life of the process. The fieldsets are independent of one another. In some implementations, a sequencing graph determines which operations a system invokes. The sequencing graph applies to any one fieldset, and there is nothing that relates one fieldset to another. Accordingly, any fieldset can be sequenced (i.e., operations invoked) independently of any other. Consequently, the fieldsets, and thus the process state, can be distributed across the various systems that execute operations of the process.

Figure 2:
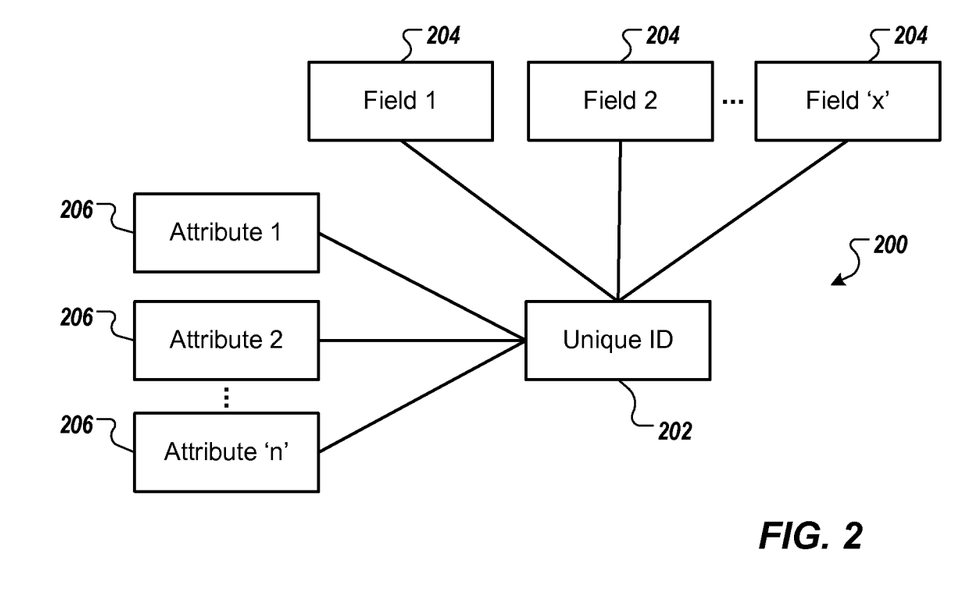
FIG. 2 is a diagram of an example field set.

FIG. 2 is a diagram of an example fieldset 200. The example fieldset 200 includes a unique identifier 202, one or more fields 204 and one or more attributes 206. The unique identifier 202 can be generated at the time of creation of the fieldset 200 and uniquely identifiers the fieldset 200 among a plurality of fieldsets. Each of the one or more fields 204 stores data corresponding to an output of an operation, as discussed in further detail below. Each of the attributes 206 stores data corresponding to attributes of the fieldset 200. Example attributes include a sequence number, a timestamp and an operation identifier. The sequence number identifies a position of the fieldset 200 in a sequence of a plurality of fieldsets. The timestamp indicates the time and/or date, at which the fieldset 200 was created, and the operation identifier identifies the operation that created the fieldset 200.

In implementations of the present disclosure a process is composed of two or more operations. The two or more operations can be distributed across a plurality of systems such that a computing device of each system executes one or more operations of the process. Execution of the process includes the generation of a plurality of fieldsets, each fieldset including data corresponding to an output of an operation and providing the data as input to a subsequent operation. In some implementations, a first system generates a first fieldset based on the output of an operation, and a second system generates a second fieldset, the first fieldset being independent of the second fieldset. In some implementations, one or more input fields to the second system intersect (i.e., have at least one field in common) with one or more output fields of the second system. As discussed in further detail below, the second system generates a new fieldset, because an operation invoked at the second system has intersecting input and output fields.

Implementations of the present disclosure are discussed in further detail below by way of a non-limiting, example process. It is appreciated that implementations of the present disclosure are equally applicable to other processes not specifically discussed herein.

Figure 3A:
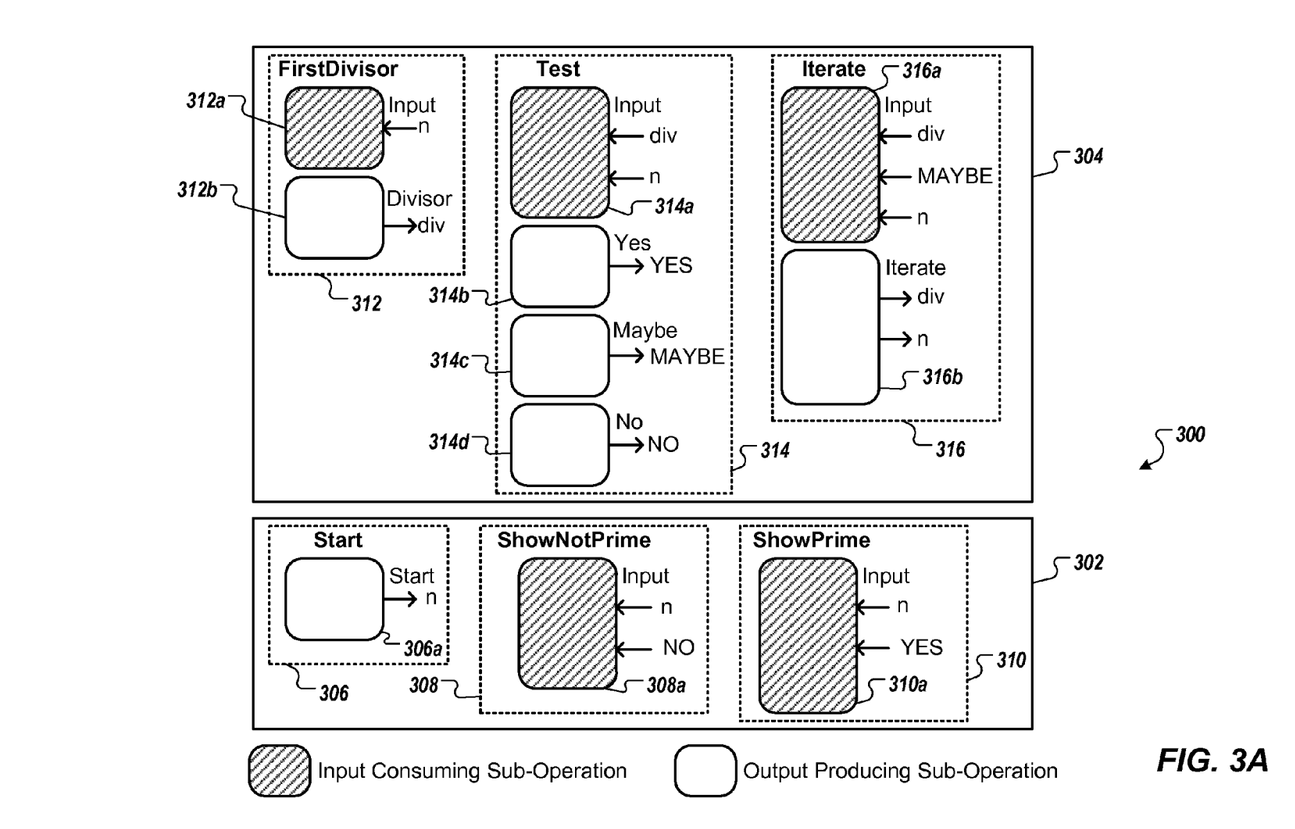
FIG. 3A is a diagram of an example process that can be distributed across a plurality of systems.

FIG. 3A is a diagram of an example process 300 that can be executed across a plurality of systems. Consequently, the process 300 can be executed as a distributed process. By way of non-limiting example, the process 300 of FIG. 3A includes a process for determining whether a given number is a prime number, and includes a plurality of operations. The example operations of FIG. 3A are provided in a first subset of operations 302 and a second subset of operations 304. In some implementations, the first subset of operations 302 can be executed by a first system (e.g., system 102 of FIG. 1) and the second subset of operations 304 can be executed by a second system (e.g., system 104 of FIG. 1).

The first subset of operations 302 includes a Start operation 306, a ShowPrime operation 308, and a ShowNotPrime operation 310. The Start operation 306 includes a sub-operation 306a that provides an output (n) to a fieldset. The ShowNotPrime operation 308 includes a sub-operation 308a that consumes an input (n) and an input (NO) that are provided from a fieldset. The ShowPrime operation 310 includes a sub-operation 310a that consumes an input (n) and an input (YES) that are provided from a fieldset.

The second subset of operations 304 includes a FirstDivisor operation 312, a Test operation 314 and an Iterate operation 316. The FirstDivisor operation 312 includes a sub-operation 312a that consumes an input (n) that is provided from a fieldset, and a sub-operation 312b that provides an output (div) to a fieldset. The Test operation 314 includes a sub-operation 314a that consumes an input (div) and an input (n) provided from a fieldset, a sub-operation 314b that provides an output (YES) to a fieldset, a sub-operation 314c that provides an output (MAYBE) to a fieldset, and a sub-operation 314d that provides an output (NO) to a fieldset. The Iterate operation 316 includes a sub-operation 316a that consumes an input (div), an input (MAYBE) and an input (n), each provided from a fieldset, and a sub-operation 316b that provides an output (div) and an output (n) to a fieldset.

Figure 3B:
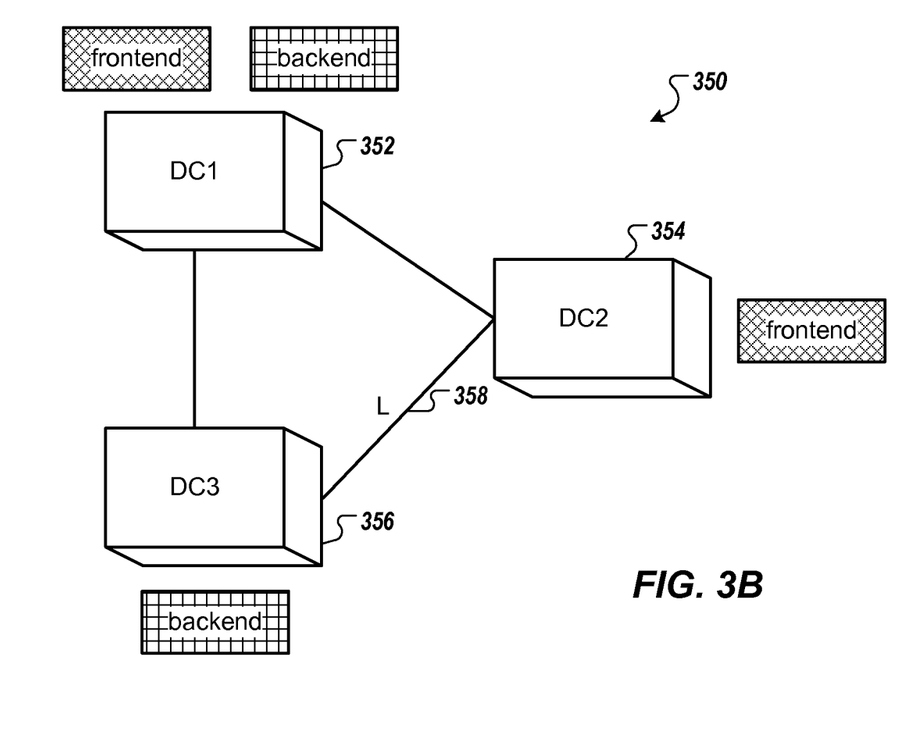
FIG. 3B is a diagram of an network architecture for executing the example process of FIG. 3A.

FIG. 3B is a diagram of an example network architecture 350 for executing the example process of FIG. 3A. The example network architecture 350 includes a first datacenter (DC1) 352, a second datacenter (DC2) 354 and a third datacenter (DC3) 356. The datacenters 352, 354, 356 communicate with one another over an IRL and network (e.g., the IRL 108 and network 110 of FIG. 1). Although three datacenters are illustrated in FIG. 3B, the example process 300 of FIG. 3A is described as being distributed across two datacenters, namely the second datacenter (DC2) 354 and the third datacenter (DC3) 356. A link (L) 358 over the IRL and network is established between the second datacenter (DC2) 354 and the third datacenter (DC3) 356 for communicating data therebetween. In the example implementation, the first set of operations 302 is performed by the second datacenter (DC2) 354, and the second set of operations 304 is performed by the third datacenter (DC3) 356.

In the example network architecture 350 of FIG. 3B, the second datacenter (DC2) 354 and the third datacenter (DC3) 356 can cooperate in a client-server relationship, where the second datacenter (DC2) 354 operates as a frontend client and the third datacenter (DC3) 356 operates as a backend server. Accordingly, the second datacenter (DC2) 354 may provide a graphical user interface (GUI) to enable user interaction with the network architecture 350. For example, a computing device of the second datacenter (DC2) 354 can execute a browser that enables a user to input data and that can present graphical output to the user.

Figure 3C:
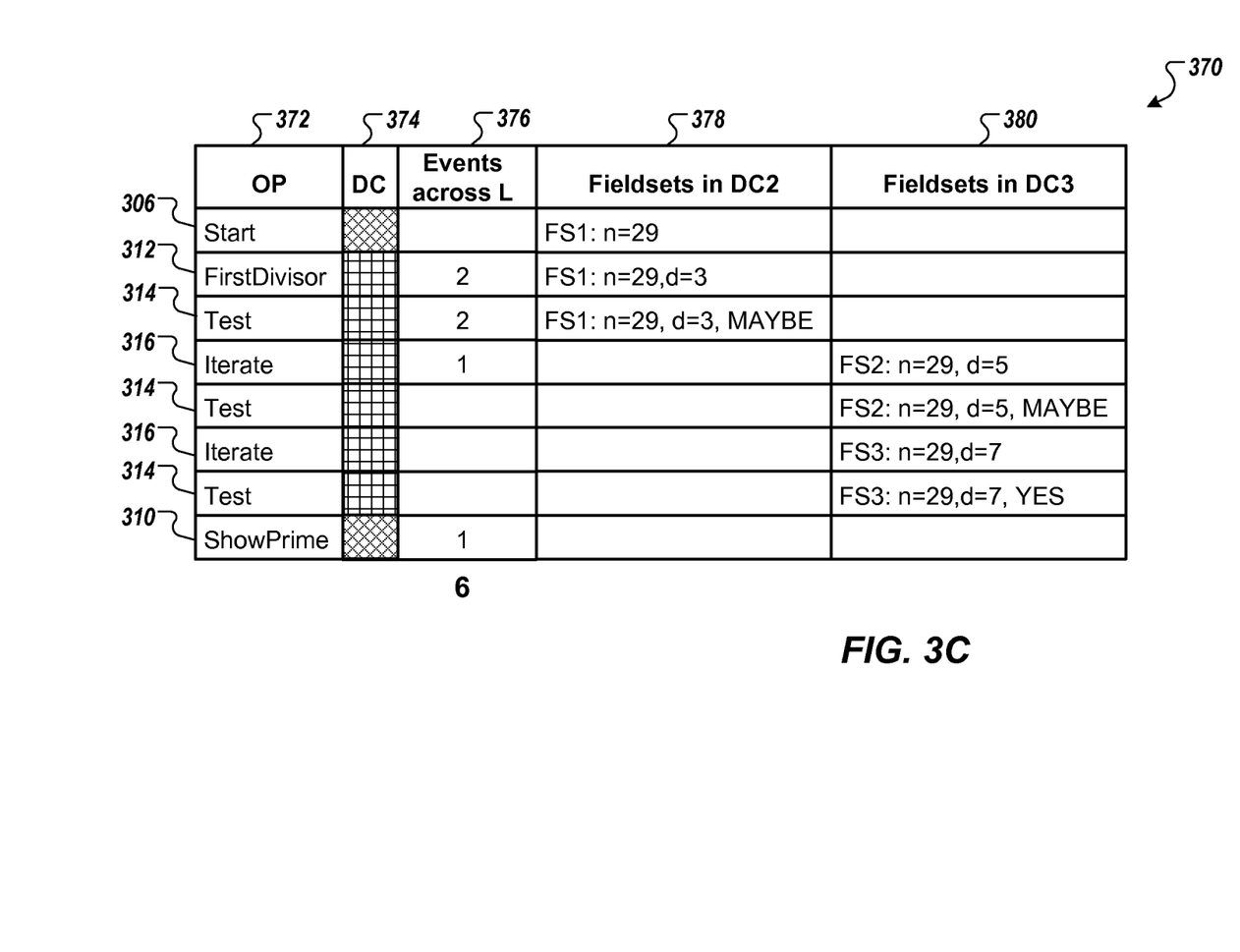
FIG. 3C is a table summarizing the example process of FIG. 3A as executed across the network architecture of FIG. 3B.

FIG. 3C is a table 370 summarizing the example process of FIG. 3A as executed across the network architecture 350 of FIG. 3B. The table 370 includes a first column 372 that provides an example sequence of the operations of the process 300 of FIG. 3A, a second column 374 that indicates where the particular operations of the sequence are performed (e.g., frontend at the second datacenter (DC2) 354, backend at the third datacenter (DC3) 356), a third column indicating the number of events per operation that are communicated between the second datacenter (DC2) 354 and the third datacenter (DC3) 356 over the link (L) 358, a third column indicating the fieldsets resident at the second datacenter (DC2) 354, and a fourth column indicating the fieldsets resident at the third datacenter (DC3) 356.

To initiate the process 300, the Start operation 306 is executed at the second datacenter (DC2). For example, the Start operation 306 can be executed in response to a user input to the browser (e.g., the user inputting a number (n) into a browser). The Start operation 306 processes the user input and generates a first fieldset (FS1) that includes an integer field (n) having a value associated therewith (i.e., n=29). The first fieldset (FS1) can also include one or more attributes, as discussed above with reference to FIG. 2. The integer value (n) is transmitted to the third datacenter (DC3) 356 over the link (L) 358. At this point, only a single field (i.e., integer (n) having a value (i.e., 29)) is provided to the third datacenter (DC3) 356. Recognizing this, the IRL routes the data to the FirstDivisor operation 312, because the FirstDivisor operation 312 is the only operation in the third datacenter (DC3) 356 that can accept a single input including integer (n). More specifically, the Test operation 314 requires two inputs, integer (n) field and a divisor (div), and three inputs, the divisor (div), an answer and the integer (n). The IRL is aware of the input requirements of each of the operations and routes the data accordingly.

The sub-operations 312a and 312b determine an initial divisor (div) based on the integer (n) (i.e., 29). In the example of FIG. 3C, the first divisor is set equal to three (i.e., div=3). The first divisor is transmitted to the second datacenter (DC2) 354 over the link (L) 358. At this point, two events have been transmitted over the link (L) 358 (i.e., transmission of integer (n) (i.e., 29) to the third datacenter (DC3) 356, and transmission of the divisor (div) (i.e., 3) to the second datacenter (DC2) 354). The second datacenter (DC2) 354 updates the first fieldset (FS1) to include a divisor field (d) having a value equal to three (i.e., d=3). At this point, the first fieldset (FS1) includes two fields, the integer field (n) having a value (i.e., 29) and a divisor field (div) having a value (i.e., 3).

Because the generated outputs collectively include a divisor (div) (i.e., 3) and an integer (n) (i.e., 29), the divisor (div) and integer (n) are provided as inputs to the Test operation 314. Specifically, only the Test operation 314 can accept the integer (n) and divisor (div) as inputs. Because, for example, the Iterate operation 316 requires divisor (div), integer (n) and answer (MAYBE) as inputs, the divisor (div) and the integer (n) are not yet routed to the Iterate operation 316. Similarly, the FirstDivisor operation 312 requires an input including only the integer (n).

The sub-operation 314a provides the value of the integer (n) (i.e., 29) and the value of the divisor (div) (i.e., 3) to the sub-operations 314b, 314c and 314d. Each of the sub-operations 314b, 314c and 314d can divide the integer (n) by the divisor (div) to determine whether the integer (n) is a prime number. For example, the sub-operations 314a, 314b and 314c can each divide the integer (n) by the divisor (div) to determine whether the integer (n) is a prime number. Using the example values provided n=29 divided by div=3 provides a quotient equal to approximately 9.66667. Consequently, the sub-operation 314c outputs MAYBE. That is, the result of the sub-operations 314b, 314c and 314d is such that it is still undetermined whether the integer (n) (i.e., 29) is a prime number.

The value MAYBE is routed to the second datacenter (DC2) 354 and is appended to the first fieldset (FS1). At this point, two more events have been transmitted over the link (L) 358 (i.e., transmission of integer (n) (i.e., 29) to the third datacenter (DC3) 356 (for consumption by the Test operation 314), and transmission of the value MAYBE to the second datacenter (DC2) 354). The second datacenter (DC2) 354 updates the first fieldset (FS1) to include a string field having the value MAYBE. At this point, the first fieldset (FS1) includes three fields, the integer field (n) having a value (i.e., 29), a divisor field (div) having a value (i.e., 3) and a string field having a value (i.e., MAYBE).

Because the generated outputs collectively include a divisor (div) (i.e., 3), an integer (n) (i.e., 29) and MAYBE, the divisor (div), integer (n) and MAYBE are provided as inputs to the Iterate operation 316. Because the divisor (div) and MAYBE were generated at the third datacenter (DC3) 356, only the integer (n) is transmitted to the third datacenter (DC3) 356 over the link (L) 358. Within the third datacenter (DC3), only the Iterate operation 316 accepts the divisor (div), the integer (n) and MAYBE as inputs.

The sub-operation 316a provides the value of the integer (n) (i.e., 29), the value of the divisor (div) (i.e., 3) and MAYBE to the sub-operation 316b. The sub-operation 316b provides the original integer (n) (i.e., 29) as output, and generates an updated divisor (div) as output. In the example of FIGS. 3A-3C, the updated divisor is provided as 5.

The original integer (n) (i.e., 29), as a new output, and the updated divisor (div) (i.e., 5) are provided to the Test operation 314, and the original integer (n) (i.e., 29) is routed to the second datacenter (DC2) 354. At this point, one more event has been transmitted over the link (L) 358. The third datacenter (DC3) 356 recognizes that the first fieldset (FS1) already includes a populated integer field and a populated divisor field. Specifically, the third datacenter (DC3) 356 is aware that input fields it receives intersect with output fields it generates. Consequently, the outputs provided by the sub-operation 316b intersect with the first fieldset (FS1). In view of the conflict, the third datacenter (DC2) 356 generates a second fieldset (FS2) including an integer field and a divisor field, and populates the integer field and the divisor field with the values (i.e., 29 and 5, respectively).

The Test operation 314 processes the values of the second fieldset (FS2). The sub-operation 314a provides the value of the integer (n) (i.e., 29) and the value of the divisor (div) (i.e., 5) to the sub-operations 314b, 314c and 314d. Each of the sub-operations 314b, 314c and 314d can divide the integer (n) by the divisor (div) to determine whether the integer (n) is a prime number. For example, the sub-operations 314a, 314b and 314c can each divide the integer (n) by the divisor (div) to determine whether the integer (n) is a prime number. Using the example values provided n=29 divided by div=5 provides a quotient equal to approximately 5.8. Consequently, the sub-operation 314c again outputs MAYBE. That is, the result of the sub-operations 314b, 314c and 314d is such that it is still undetermined whether the integer (n) (i.e., 29) is a prime number.

Because the second fieldset (FS2) is resident at the third datacenter (DC3) 356, MAYBE is appended to the second fieldset (FS2) at the third datacenter (DC3) 356. At this point, no additional events have been transmitted over the link (L) 358, and the second fieldset (FS2) includes three fields, the integer field (n) having a value (i.e., 29), a divisor field (div) having a value (i.e., 5) and a string field having a value (i.e., MAYBE).

The divisor (div), integer (n) and MAYBE are provided as inputs to the Iterate operation 316. Within the third datacenter (DC3), only the Iterate operation 316 accepts the divisor (div), the integer (n) and MAYBE as inputs. The sub-operation 316a provides the value of the integer (n) (i.e., 29), the value of the divisor (div) (i.e., 3) and MAYBE to the sub-operation 316b. The sub-operation 316b provides the original integer (n) (i.e., 29) as output, and generates an updated divisor (div) as output. In the example of FIGS. 3A-3C, the updated divisor is provided as 7.

The third datacenter (DC3) 356 recognizes that the second fieldset (FS2) already includes a populated integer field and a populated divisor field. Specifically, the third datacenter (DC3) 356 is aware that input fields it receives intersect with output fields it generates. Consequently, the outputs provided by the sub-operation 316b conflict with the second fieldset (FS2). In view of the conflict, the third datacenter (DC3) 356 generates a third fieldset (FS3) including an integer field and a divisor field, and populates the integer field and the divisor field with the values (i.e., 29 and 7, respectively).

The Test operation 314 processes the values of the third fieldset (FS3). The sub-operation 314a provides the value of the integer (n) (i.e., 29) and the value of the divisor (div) (i.e., 7) to the sub-operations 314b, 314c and 314d. Each of the sub-operations 314b, 314c and 314d can divide the integer (n) by the divisor (div) to determine whether the integer (n) is a prime number. For example, the sub-operations 314a, 314b and 314c can each divide the integer (n) by the divisor (div) to determine whether the integer (n) is a prime number. Using the example values provided n=29 divided by div=7 provides a quotient equal to approximately 4.1429. Consequently, the sub-operation 314b outputs YES. That is, the result of the sub-operations 314b, 314c and 314d is such that it is determined that the integer (n) (i.e., 29) is a prime number.

Because the third fieldset (FS3) is resident at the third datacenter (DC3) 356, YES is appended to the third fieldset (FS3) at the third datacenter (DC3) 356. The output YES is routed to the second datacenter (DC2) 354. At this point, one additional event has been transmitted over the link (L) 358. The ShowPrime operation 310 is the only operation that accepts the integer (n) and YES as inputs. Consequently the sub-operation 310a receives and processes the inputs. For example, the sub-operation 310a can generate an indication on a display to inform a user, using a computing device at the second datacenter (DC2) 354, that the number 29 is indeed a prime number.

The distributed process of FIGS. 3A-3C is a relatively simple, example process that is provided to illustrate implementations of the present disclosure. Execution of the example process of FIGS. 3A-3C, using the example integer value of 29, resulted in the generation of three fieldsets distributed across two datacenters. The distributed fieldsets result in a distributed state of the process. Further, the number of events transmitted between the participating datacenters totaled 6. An equivalent process without distributing the state of the process (i.e., the fieldsets are all generated and maintained at one datacenter of the plurality of datacenters) would result in the number of events transmitted between the participating datacenters totaling 12. Accordingly, by distributing the state of the example process across the participating datacenters, traffic between the datacenter is reduced by 50%. Although this 50% value is based on the example values provided for the example process, distributing the state of a process across participating systems significantly reduces the traffic between the participating systems.

Figure 4:
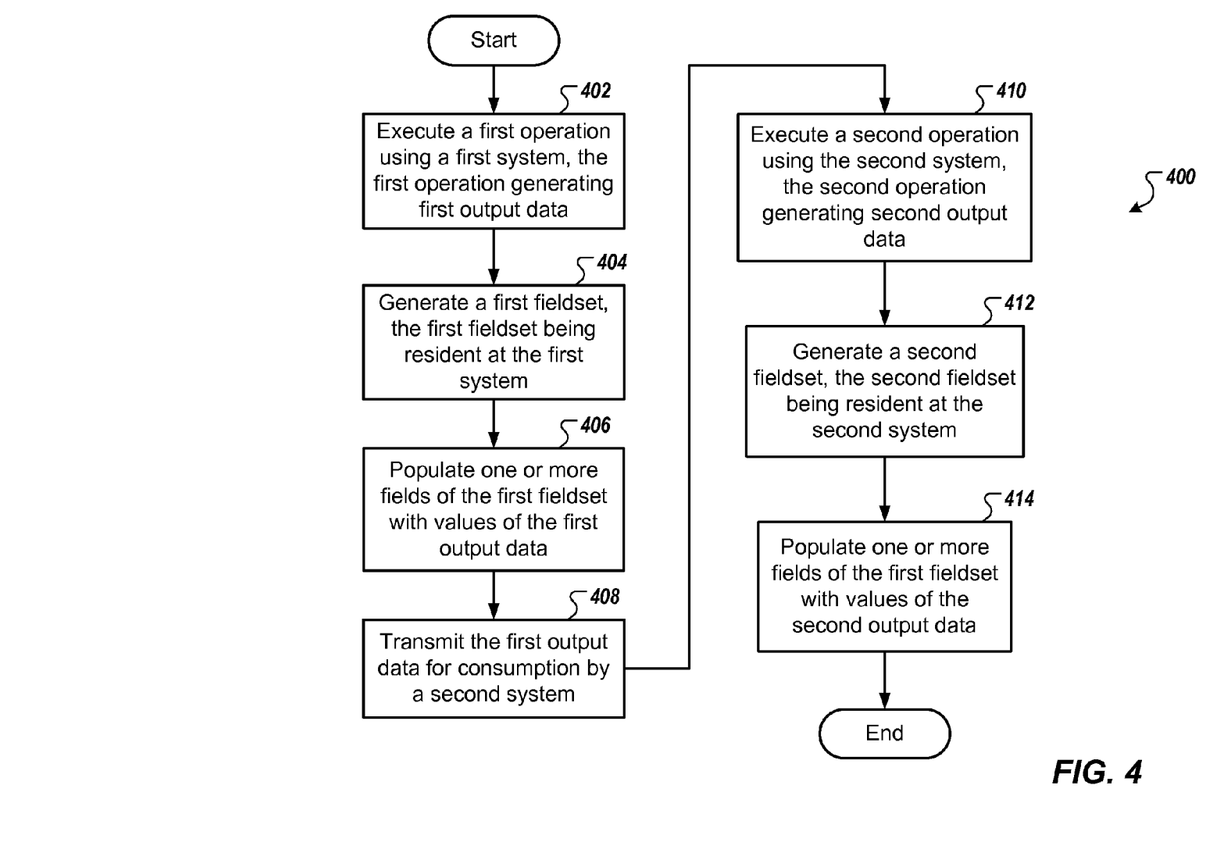
FIG. 4 is a flowchart illustrating an example process that can be executed in implementations of the present disclosure.

FIG. 4 is a flowchart illustrating an example process 400 that can be executed in implementations of the present disclosure. A first operation using a first system is executed (402), the first operation generating first output data. For example, the system 102 of FIG. 1 executes a first operation of a distributed process and provides corresponding output. A first fieldset is generated (404), the first fieldset being resident at the first system and including one or more fields corresponding to the first output data. For example, the system 102 of FIG. 1 generates the fieldset. The one or more fields of the first fieldset are populated with values of the first output data (406) and the first output data is transmitted to a second system (408). For example, the system 102 of FIG. 1 populates the one or more fields of the first fieldset with values of the first output data and the first output data is transmitted to the system 104.

A second operation is executed using the second system (410), the second operation generating second output data, the second output data overlapping the first output data. For example, the system 104 executes the second operation of the distributed process and provides corresponding output. The second output data overlaps the first output data in the sense that data of the first output data corresponds to a field and data of the second output data corresponds to the field. In view of the overlap, a second fieldset is generated (412), the second fieldset being resident at the second system and including one or more fields corresponding to the first output data and the second output data. For example, the second system 104 of FIG. 1 generates the second fieldset. The one or more fields of the second fieldset are populated with values of the second output data (414). For example, the second system 104 of FIG. 1 populates the one or more fields of the first fieldset with values of the second output data.

Implementations of the present disclosure provide mask sets for routing data between a plurality of systems (e.g., systems 102, 104, 106) within a network architecture (e.g. network 100). A mask set is similar to a fieldset, discussed above with reference to FIG. 2. The fields of a mask set, however, define fields that must be absent from a dataset supplying input to an operation. Accordingly, and as discussed below by way of example, mask sets provide an expressive capability. For example, a system can specify that specifies that it does not want to receive data whose origin is itself. The system can register one or more mask sets with the IRL. When routing data between systems, the IRL can reference the registered one or more mask sets to determine whether particular data should be routed to a particular system.

Implementations of the present disclosure are discussed in further detail below by way of a non-limiting context including system updates. It is appreciated that implementations of the present disclosure are equally applicable in other contexts not specifically discussed herein.

Figure 5A:
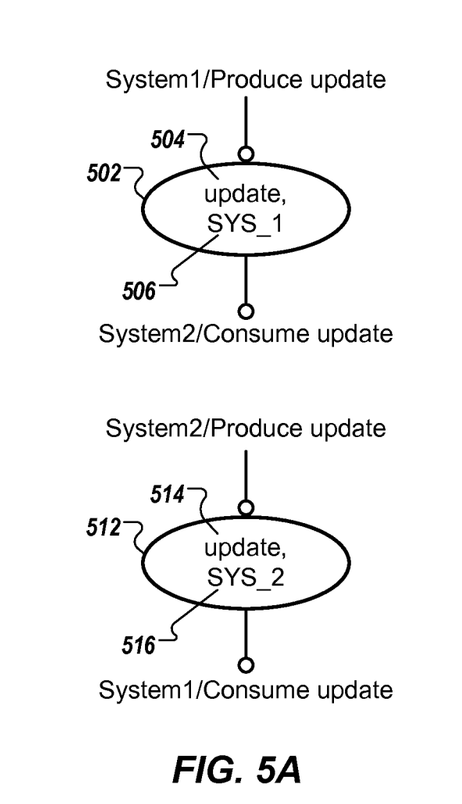
FIG. 5A is a diagram illustrating an update relationship between first and second systems.
Figure 5B:
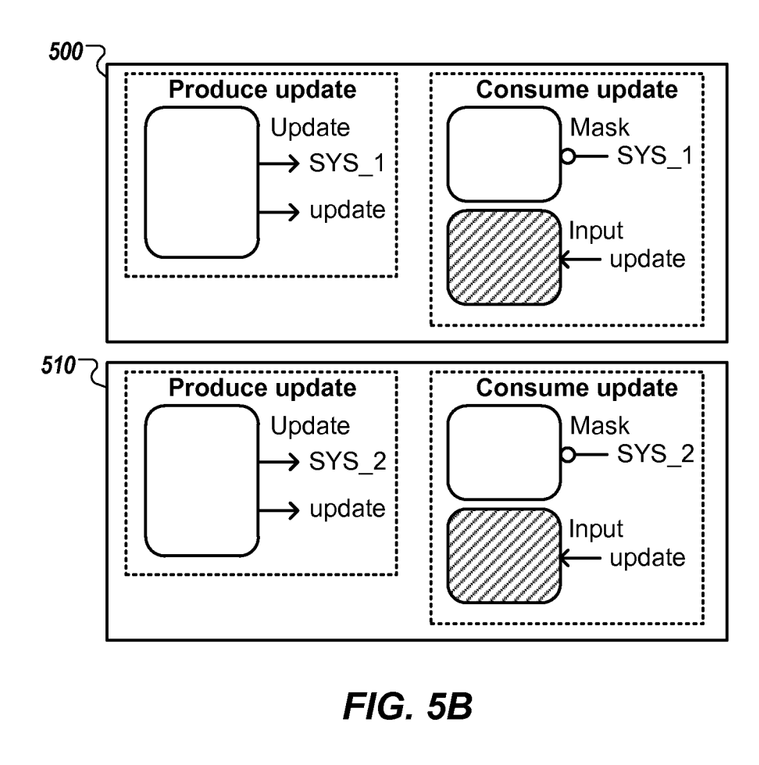
FIG. 5B is a diagram illustrating the update relationship between the first and second systems of FIG. 5A in the context of mask sets.

FIG. 5A is a diagram illustrating an update relationship between first and second systems. FIG. 5B is a diagram illustrating the update relationship between the first and second systems of FIG. 5A in the context of mask sets. A first system 500 generates an update fieldset 502 including an update 504 and an indicator 506, the indicator indicating the first system 500 as the source of the update 504. A second system 510 consumes the data provided in the update fieldset 502. The second system 510 also generates an update fieldset 512 including an update 514 and an indicator 516, the indicator indicating the second system 510 as the source of the update 514. The first system 500 consumes the data provided in the update fieldset 512.

In the example of FIGS. 5A and 5B, the first system 500 registers a mask set with the IRL. The mask set of the first system 500 can be identical to the fieldset 502 with the fields of the mask set indicating datasets that should not be routed to the first system. For example, the mask set registered by the first system 500 can include a mask field including the value SYS_1. In this manner, the first system 500 can indicate that it does not want to receive datasets corresponding to updates that it generates itself. Consequently, when the first system 500 generates an update and broadcasts a corresponding update dataset for the consumption of other systems (e.g., the second system 510), the update dataset is not also routed back to the first system 500, from which it originated.

In the example of FIGS. 5A and 5B, the second system 510 registers a mask set with the IRL. The mask set of the second system 510 can be identical to the fieldset 512 with the fields of the mask set indicating datasets that should not be routed to the first system. For example, the mask set registered by the second system 510 can include a mask field including the value SYS_2. In this manner, the second system 510 can indicate that it does not want to receive datasets corresponding to updates that it generates itself. Consequently, when the second system 510 generates an update and broadcasts a corresponding update dataset for the consumption of other systems (e.g., the first system 500), the update dataset is not also routed back to the second system 510, from which it originated.

Figure 6:
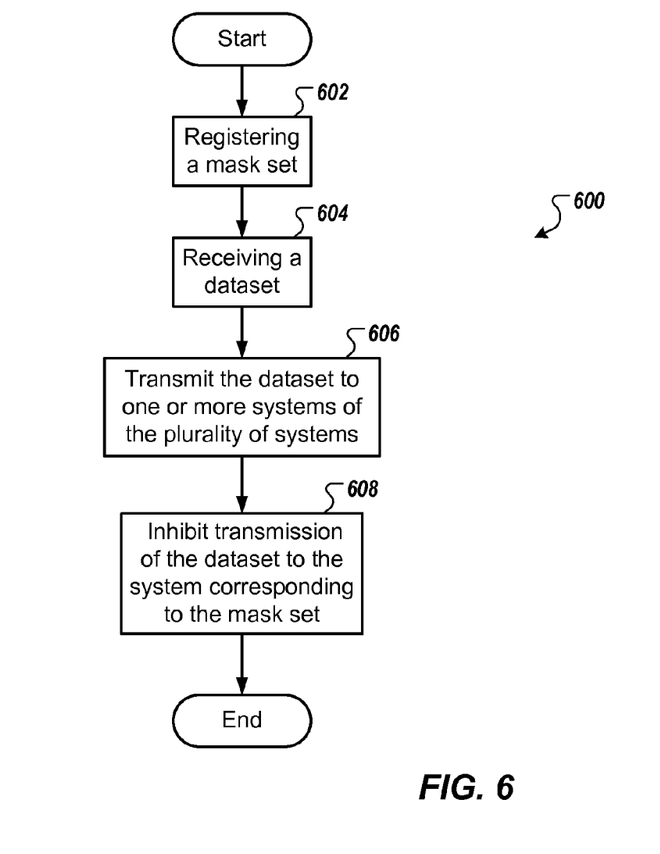
FIG. 6 is a flowchart illustrating an example process that can be executed in implementations of the present disclosure.

FIG. 6 is a flowchart illustrating an example process 600 that can be executed in implementations of the present disclosure. A mask set is registered (602), the mask set including one or more fields, each of the one or more fields indicating a field that must be absent from datasets that are to be provided as input to a first system of a plurality of systems. For example, the IRL 108 of FIG. 1 can receive the mask set from the system 102 and can register the mask set for routing of one or more datasets within the network architecture 100. A dataset is received (604), the dataset including a field that is present in the mask set. For example, the IRL 108 of FIG. 1 can receive a dataset from one of systems 102, 104 and 108. The dataset is transmitted to one or more systems of the plurality of systems (606). For example, the IRL 108 of FIG. 1 can transmit the dataset to one of systems 104 and 108. Transmission of the dataset to the first system (608). For example, the IRL 108 of FIG. 1 can inhibit transmission of the data set to the system 102, the mask set indicating that the dataset should not be provided as input to the system 102.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementations are within the scope of the following claims. For example, the actions recited in the claims can be performed in a different order and still achieve desirable results.

What is claimed is:

1. A computer-implemented method executed using one or more processors, the method comprising:
   executing a first operation using a first system, the first operation generating first output data;
   generating a first fieldset, the first fieldset being resident at the first system and including one or more first fields corresponding to the first output data;
   populating the one or more first fields of the first fieldset with values of the first output data;
   transmitting, by the first system and to a second system, the first fieldset including i) the one or more first fields and ii) the first output data corresponding to the one more first fields;

receiving, by the second system, the first fieldset including
i) the one or more first fields and ii) the first output data
corresponding to the one more first fields;
executing a second operation using the second system, the
second operation generating second output data;
determining, by the second system, that at least a portion of
the second output data generated by the second system
intersects with at least a portion of the first output data
that is received from the first system, the determining
including:
identifying a particular field of the first fieldset received
from the first system that the at least a portion of the
second output data generated by the second system
corresponds to, and
determining that the particular field of the first fieldset
received from the first system is populated with at
least a portion of the first output data received from
the first system;
in response to determining that at least a portion of the
second output data generated by the second system
intersects with at least a portion of the first output data
that is received from the first system, generating, by the
second system, a second fieldset, the second fieldset
being resident at the second system and including i) one
or more second fields corresponding to the second output data that intersects with the at least a portion of the
first output data and ii) one or more third fields corresponding to the remaining first output data; and
populating i) the one or more second fields of the second
fieldset with values of the second output data that intersects with the at least a portion of the first output data and
ii) the one more third fields of the second field set with
values of the remaining first output data.

2. The method of claim 1, wherein the first operation is executed using one or more computing devices of the first system.

3. The method of claim 1, wherein the second operation is executed using one or more computing devices of the second system.

4. The method of claim 1, further comprising:
executing a third operation, the third operation generating
third output data; and
appending one or more fields to one of the first fieldset and
the second fieldset to provide one or more appended
fields, the one or more appended fields populated with
values of the third output data.

5. The method of claim 4, wherein the first system executes the third operation.

6. The method of claim 4, wherein the second system executes the third operation.

7. The method of claim 1, wherein the one or more first fields of the first fieldset are populated with values of the first output data.

8. The method of claim 1, further comprising receiving an user input, and executing the first operation in response to the user input.

9. The method of claim 1, further comprising providing an output to be displayed on a display, the output included in the second output data.

10. The method of claim 1, wherein transmitting includes routing the first output data using an information routing layer of a network.

11. The method of claim 10, wherein the information routing layer includes a state machine.

12. The method of claim 10, wherein the information routing layer is executed by a computing device.

13. The method of claim 12, wherein the plurality of devices are distributed across a plurality of systems.

14. The method of claim 13, wherein the plurality of systems comprise at least one of the first system and the second system.

15. The method of claim 10, wherein the information routing layer is executed by a plurality of computing devices.

16. The method of claim 1, wherein each of the first and second fieldsets further includes one or more attributes.

17. The method of claim 1, wherein each of the first and second fieldsets includes a unique identifier.

18. The method of claim 1, further comprising:
registering, by the first system and with an information
routing layer (IRL), a mask set, the mask set including
one or more fields, each of the one or more fields of the
mask set indicating a field that must be absent from
fieldsets that are to be provided as input to the first
system;
receiving, by the IRL, the first fieldset, the first fieldset
including a particular field that is present in the mask set;
determining, by the IRL, that the first fieldset was generated by the first system;
in response to determining that the first fieldset was generated by the first system:
i) transmitting, by the IRL, the first fieldset to the second
system, and ii) inhibiting transmission, by the IRL, of
the first fieldset to the first system.

19. The method of claim 18, further comprising generating the mask set using the first system.

20. A system, comprising:
a first system comprising one or more computing devices
that are operable to:
execute a first operation, the first operation generating
first output data,
generate a first fieldset, the first fieldset being resident at
the first system and including one or more first fields
corresponding to the first output data,
populate the one or more first fields of the first fieldset
with values of the first output data, and
transmit, to a second system, the first field set including
i) the one or more first fields and ii) the first output
data corresponding to the one or more first fields;
the second system comprising one or more computing
devices that are operable to:
receive the first fieldset including i) the one or more first
fields and ii) the first output data corresponding to the
one or more first fields,
execute a second operation, the second operation generating second output data,
determine that at least a portion of the second output data
generated by the second system intersects with at least
a portion of the first output data that is received from
the first system, the determining including:
identify a particular field of the first fieldset received
from the first system that the at least a portion of the
second output data generated by the second system
corresponds to, and
determine that the particular field of the first fieldset
received from the first system is populated with at
least a portion of the first output data received from
the first system,
in response to determining that at least a portion of the
second output data generated by the second system
intersects with at least a portion of the first output data
that is received from the first system, generate a second fieldset, the second fieldset being resident at the
second system and including i) one or more fields corresponding to the second output data that intersects with at least a portion of the first output data and ii) one or more third fields corresponding to the remaining first output data, and populate i) the one or more fields of the second fieldset with values of the second output data that intersects with the at least a portion of the first output data and ii) the one more third fields of the second field set with values of the remaining first output data.

* * * * *